United States Patent [19]

Slavik et al.

[11] 3,783,186

[45] Jan. 1, 1974

[54] AUTOMATIC HUE CONTROL AND METHOD

[75] Inventors: William H. Slavik; Brett A. Valiquet, both of Palos Hills, Ill.

[73] Assignee: Motorola, Inc., Franklin Park, Ill.

[22] Filed: May 15, 1972

[21] Appl. No.: 253,375

[52] U.S. Cl. .......... 178/5.4 HE

[51] Int. Cl. .......... H04n 9/12

[58] Field of Search .......... 178/5.4 R, 5.4 HE, 178/5.4 AC

[56] References Cited

UNITED STATES PATENTS

| | | | |
|---|---|---|---|
| 2,888,514 | 5/1959 | Pritchard | 178/5.4 HG |
| 3,662,097 | 5/1972 | Rennick | 178/5.4 HG |

OTHER PUBLICATIONS

"A Flesh-Tone Correction Circuit", Ekstrand, IEEE Trans. Broadcast & Telev. Receivers, Vol. BTR-7, No. 3, Aug., 1971.

*Primary Examiner*—Richard Murray
*Attorney*—Vincent Rauner et al.

[57] ABSTRACT

In a three-color television receiver utilizing red, blue and green demodulators, variable phase shifting networks (or permanently phase shifted networks) are connected to supply to the red and blue demodulators reference signals with predetermined phases relative to the synchronizing signal. A reference signal is provided or the red and blue components of the chrominance signal are combined to form a negative green component and the positive green component is compared thereto to provide a source of signal for reducing the output of the red and blue component amplifiers when the positive green component exceeds the reference signal.

12 Claims, 4 Drawing Figures

AUTOMATIC HUE CONTROL AND METHOD

BACKGROUND OF THE INVENTION

1. Field of the Invention

In color television transmitted according to NTSC standards, a synchronizing signal or burst and a chrominance signal are transmitted in a composite television signal. The phase of the chrominance signal relative to the synchronizing signal is critical, since it determines the hue or color ultimately produced in the receiver by the chrominance signal. Because of errors in transmission, caused by faulty equipment, improper adjustment, etc., the phase of the chrominance signal relative to the synchronizing signal will often be improper. These phase errors are most noticeable along the maximum acuity or I axis (reddish orange color and least noticeable along the minimum acuity or Q axis (bluish red color.)

2. Description of the Prior Art

In the prior art, attempts have been made to minimize the effects of transmitted phase errors between the synchronizing signal and the chrominance signal by bringing all colors which are close to the I axis closer or onto the I axis. This means that all colors which are even close to skin color will appear skin color when the correction is being utilized. Most receivers have switches for including the correction or excluding the correction as desired.

In a copending application entitled "Present Control System For A Color Television Receiver," Ser. No. 140,489, filed May 5, 1971 and assigned to the same assignee, a hue correction system is described wherein the phase of the synchronizing signal applied to the red and blue color demodulators is altered to increase the angle between the red and blue color demodulators and, thereby, reduce the amplitude of the color components along the Q axis while increasing the amplitude of the color components along the I axis. While this system operates to provide better skin colors and adjacent colors, it has a tendency to reduce the greens.

SUMMARY OF THE INVENTION

The present invention pertains to apparatus and method for measuring the third color component from the third color demodulator and controlling the amplitude of the first and second color components in response thereto.

It is an object of the present invention to provide an improved automatic hue control.

It is a further object of the present invention to provide apparatus and method of accentuating flesh tones when present and accentuating greens when flesh tones are not present.

It is a further object of the present invention to provide apparatus for comparing positive green components and a reference signal, such as negative green components, and reducing the amplitude of red and blue components when the positive green component exceeds the reference signal.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

It is well known in the art that the chrominance signal can be represented by a rotating vector, the instantaneous angle of which determines the hue or color and the instantaneous magnitude of which determines the amount of the color. In a diagram of this rotating vector it is relatively standard to represent the function (B—Y) as zero degrees, or extending along the abscissa, and the function (R—Y) as 90°, or extending along the ordinate. The synchronizing signal (burst or output signal from a subcarrier oscillator) has a phase of 180°, or opposite the function (B—Y). The functions Q and I (the axis of least acuity and the axis of greatest acuity, respectively) are positioned at 33° and 123°, respectively. The colors red, green and blue lie at 103°, 241° and 347°, respectively. Throughout this description, it should be understood that the use of a color, i.e., red, blue and green, to describe certain color components and parts of the apparatus, refers to the particular gun or portion of the CRT to which the signal will be applied and the phase of these signals does not necessarily coincide with the angles of the red, green and blue colors described above.

Figure 1:
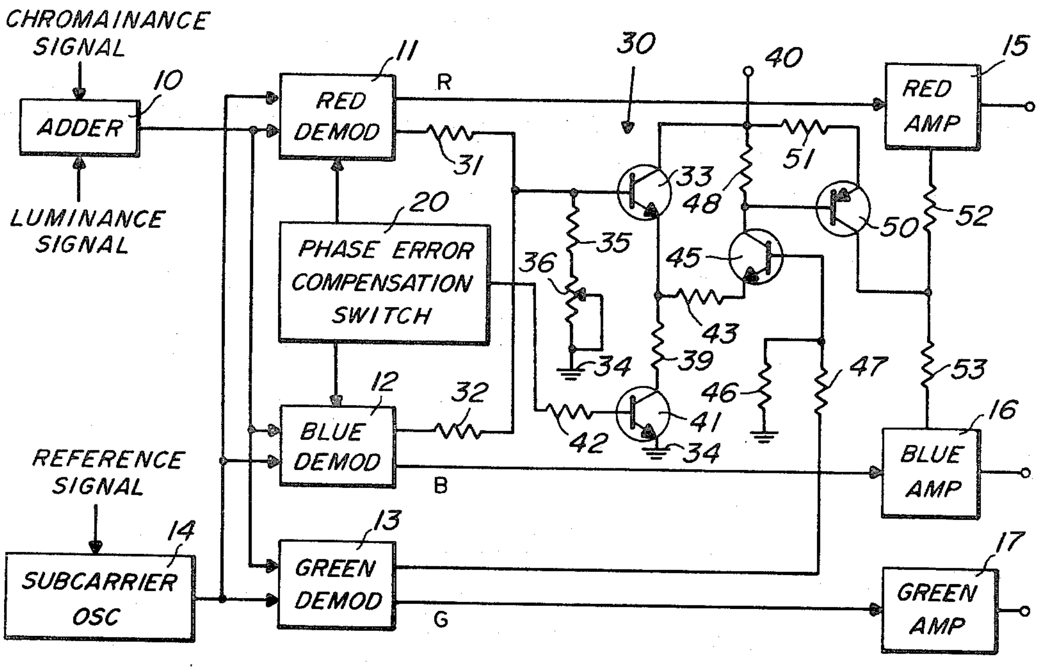
FIG. 1 is a schematic diagram, with portions thereof in block form, illustrating the demodulation portion of a three-color television receiver including an embodiment of the present invention.

Referring specifically to FIG. 1, an adder circuit 10 is illustrated in block form with a chrominance and a luminance signal applied thereto and the output being applied to red, blue and green demodulators 11, 12 and 13, respectively. A subcarrier oscillator 14, having a reference or burst signal applied thereto to synchronize the phase and frequency thereof, provides a synchronizing signal which is applied to the red, blue and green demodulators 11, 12 and 13. The outputs of the red, blue and green demodulators 11, 12 and 13 are applied to red, blue and green amplifiers 15, 16 and 17, respectively. The outputs of the red, blue and green amplifiers, 15, 16 and 17 are applied to the red, blue and green guns of a cathode ray tube of the three-color shadow mask variety. While the present apparatus is illustrated in conjunction with circuitry wherein the chrominance and luminance signals are combined, it should be understood that it might be utilized with other circuits, including circuits wherein the signals are matrixed and the matrixing is accomplished in the cathode ray tube or prior thereto.

The phase of the reference signal from the subcarrier oscillator 14 which is applied to the demodulators is normally shifted within the demodulators 11, 12 and 13 so that the demodulators provide a component of the chrominance signal lying along the red, blue and green color axes described above. When errors in transmission occur (or whenever else desired) the phase of the component produced by the red and blue demodulators 11 and 12 may be shifted by operating a phase error compensation switch 20. Operation of the phase error compensation switch 20 provides a wider angle between the components produced by the red and blue demodulators 11 and 12 so that the demodulation curve described above is no longer circular but becomes elliptical with the major axis generally along the I axis. It should be understood that other phase error compensations might be devised but the present one is utilized for explanatory purposes.

An embodiment 30 of the improved automatic hue control is illustrated in schematic form in conjunction with the apparatus described above. The hue control 30 includes a pair of resistors 31 and 32 connected in series between an output of the red demodulator 11 and an output of the blue demodulator 12. The junction of the resistors 31 and 32 is connected to the base of an NPN transistor 33. The base of the transistor 33 is also connected to ground 34 through a series connected fixed resistor 35 and variable resistor 36, which are utilized to adjust the bias or point of conduction of the transistor 33. The collector of the transistor 33 is connected to a suitable source of positive voltage 40 and the emitter is connected through a resistor 39 to the collector of an NPN transistor 41. The emitter of the transistor 41 is connected directly to ground 34 and the base is connected through a resistor 42 to the phase error compensation switch 20 such that upon operation of the switch 20 the transistor 41 is turned on. The emitter of the transistor 33 is also connected through a resistor 43 to the emitter of a NPN transistor 45, which transistor 45 cooperates with the transistor 33 to form a differential amplifier. The base of the transistor 45 is connected through a resistor 46 to ground 34 and through a resistor 47 to an output of the green demodulator 13. The collector of the transistor 45 is connected to the positive source of voltage 40 through a resistor 48 and directly to the base of a PNP type transistor 50. The emitter of the transistor 50 is connected to the positive source of voltage 40 through a resistor 51. The collector of the transistor 50 is connected to the junction of a pair of series connected resistors 52 and 53, which resistors 52 and 53 are connected between red and blue amplifiers 15 and 16.

In the operation of the circuit of FIG. 1, a portion of the red component from the red demodulator 11 and a portion of the blue component from the blue demodulator 12 are combined in the resistive network described and applied to the base of the transistor 33. This combined signal essentially represents a negative green component of the chrominance signal (the negative meaning that it is approximately 180° out of phase with the positive green component from the green demodulator 13). A positive green component of the chrominance signal is applied from the green demodulator 13 to the base of the transistor 45. The transistor 41 is essentially a switch which is turned on when the phase error compensation switch 20 is on to allow conduction of either or both of the transistors 33 and 45. When the phase error compensation switch 20 is off the transistor 41 is in a nonconducting state and the automatic hue control 30 is not in operation.

With the compensation switch 20 on and no signal applied from the green demodulator 13 to the base of the transistor 45, any signal applied from either or both of the red and blue demodulators 11 and 12 to the base of the transistor 33, which is large enough to overcome the bias on the transistor 33, will cause conduction of the transistor 33 and consequent reverse bias of the transistor 45. Since the transistor 45 is reverse biased and nonconducting the transistor 50 is nonconducting and no signal is being applied therefrom to the red and blue amplifiers 15 and 16. Therefore, both of the amplifiers 15 and 16 are operating normally and component signals applied thereto from the demodulators 11 and 12 are amplified and applied to the CRT in a normal fashion. Thus, with no green components present skin colors and other colors lying on or adjacent the I axis are enhanced.

When a green component is present at the output of the green demodulator 13, this signal is applied to the base of the transistor 45 and, if it can overcome any bias applied to the transistor 45 by conduction of the transistor 33 through the resistor 39, the transistor 45 will conduct lowering the voltage at the collector thereof. As the voltage on the collector of the transistor 45 is lowered the transistor 50 eventually begins to conduct and supply a signal through the resistors 52 and 53 to the amplifiers 15 and 16, respectively. The signal applied to the amplifiers 15 and 16 by the transistor 50 is utilized to set bias levels in the amplifiers 15 and 16 and essentially reduces the amplitude of the outputs of the amplifiers 15 and 16 by the amount of signal applied thereto through the resistors 52 and 53. Thus, when a green component is present in the chrominance signal the red and blue components are reduced a relative amount to enhance the green component. In terms of the rotating vector previously described, the demodulation curve becomes substantially circular throughout the time that a sufficiently strong green component of the chrominance signal is present.

Figure 2:
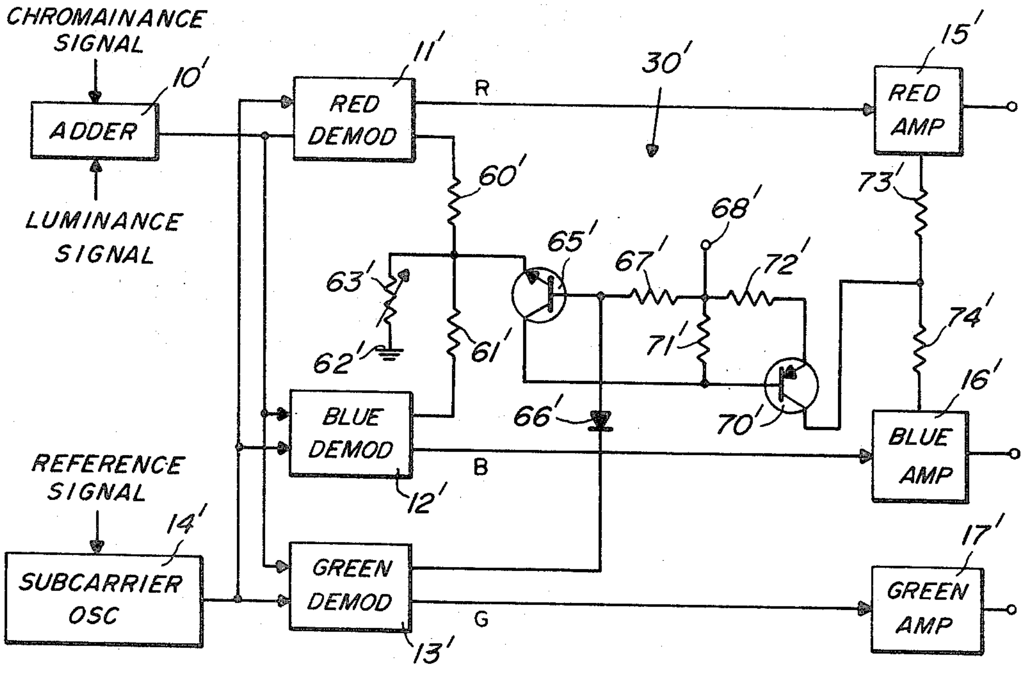
FIG. 2 is a schematic diagram, portions thereof in block form, illustrating the demodulation portion of a three-color television receiver with another embodiment of the present invention.

Referring to FIG. 2, similar components are designated with similar numbers and all of the numbers have a prime added to indicate a different embodiment. An adder 10′ and subcarrier oscillator 14′ are connected to red, blue and green demodulators 11′, 12′ and 13′, respectively, as described in conjunction with FIG. 1 and the demodulators 11′, 12′ and 13′ are connected to three amplifiers 15′, 16′ and 17′ as previously described. Another embodiment 30′ of an automatic hue control is schematically illustrated in conjunction with the blocks described. A pair of resistors 60′ and 61′ are connected in series between an output of the red demodulator 11′ and the output of the blue demodulator 12′. The junction of the resistors 60′ and 61′ is connected to ground 62′ through a variable resistor 63′ and to the emitter of an NPN type transistor 65′. The base of the transistor 65′ is connected to the anode of a diode 66′, the cathode of which is connected to receive an output from the green demodulator 13′. The base of the transistor 65′ is also connected through a resistor 67′ to a suitable source of positive voltage 68′. The collector of the transistor 65′ is connected directly to the base of PNP type transistor 70′ and through a resistor 71′ to the positive source of voltage 68′. The emitter of the transistor 70′ is connected to the positive source of voltage 68′ through a resistor 72′. The collector of the transistor 70′ is connected to the junction between a pair of series connected resistors 73′ and 74′, which are connected between the red and blue amplifiers 15′ and 16′.

It should be noted that no phase error compensation switch 20 is included in the circuit of FIG. 2 and it is assumed that the angle between the components produced by the red and blue demodulators 11′ and 12′ is continuously greater than 90° to produce an elliptical demodulation curve with the major axis lying generally along the I axis. The transistor 65′ and its associated circuitry operates in a fashion similar to a differential amplifier and essentially compares the amplitude of the component produced by the green demodulator 13′ to the amplitude of the combined components of the red demodulator 11′ and the blue demodulator 12′. When the amplitude of the green component is sufficient to overcome biases applied to the transistor 65′, the transistor 65′ begins to conduct causing the transistor 70′ to conduct and apply a signal to the amplifiers 15′ and 16′ through the resistors 73′ and 74′. The signals applied to the amplifiers 15′ and 16′ set a bias level within the amplifiers 15′ and 16′ which reduces the output an amount proportional to the signal applied through the resistors 73′ and 74′. Thus, the green signals are enhanced by reducing the amount of signal applied to the red and blue guns when a substantial green component is present.

In the circuitry described above the positive green component is compared to a reference signal which, because of the type of signals being utilized, is described as a negative green or red plus blue component. It should be understood, however, that different reference signals might be utilized with reference to the positive green signal to control amplitudes of the red and blue components. For example, in a demodulation system where matrixing is accomplished subsequent to the demodulators, the components obtained from the demodulators are (R—Y), (B—Y), and (G—Y). In these systems the (G—Y) component might simply be compared to a fixed DC voltage, which voltage might be adjustable to vary the amount of (G—Y) component required before the automatic hue control begins to operate. Embodiments incorporating these variations are illustrated schematically in FIGS. 3 and 4.

Figure 3:
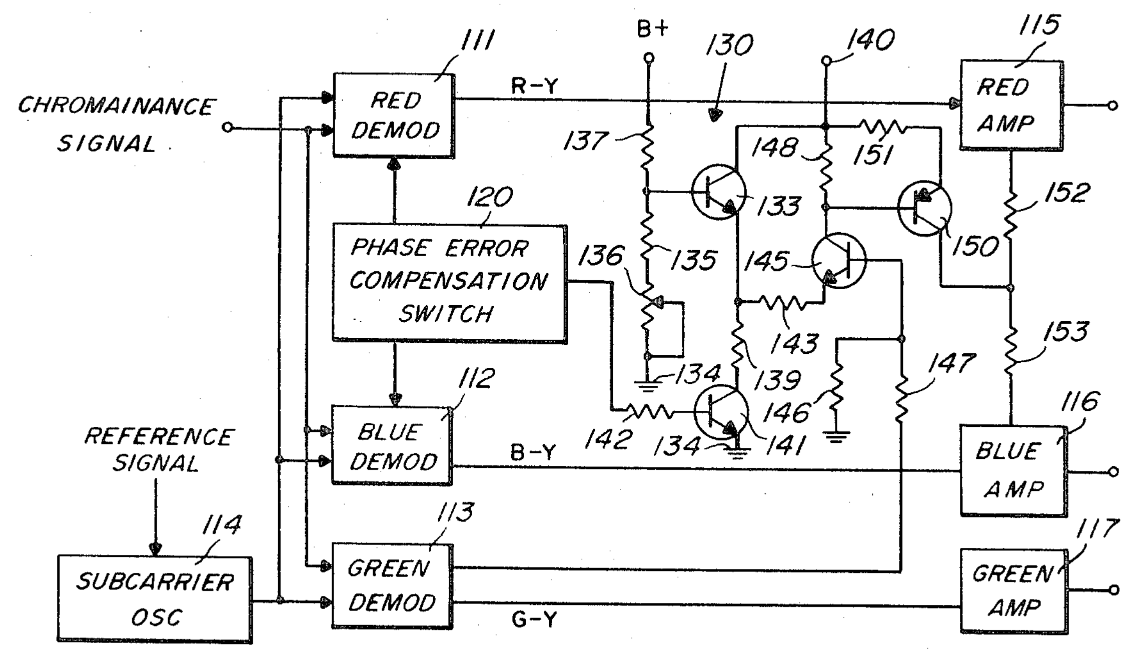
FIG. 3 is a schematic diagram similar to FIG. 1 illustrating another embodiment of the present invention.

Referring to FIG. 3, similar components are designated with similar numbers and all of the numbers have a 1 prefix to designate another embodiment similar to FIG. 1. In this embodiment the adder is eliminated and a chrominance signal is applied directly to red, blue and green demodulators 111, 112 and 113, respectively. The reference signal is also applied to the demodulators from a subcarrier oscillator 114. The demodulators 111, 112 and 113 provide output signals (R—Y), (B—Y) and (G—Y), respectively, to red, blue and green amplifiers 115, 116 and 117. In this type of circuit the demodulated chrominance signals and the luminance signals are matrixed together at some point subsequent to the demodulation, which matrixing is not illustrated in these figures because it does not form a part of this invention. The output of the green demodulator 113 is applied through a resistor 147 to the base of a transistor 145, which transistor 145 operates with a transistor 133 to form a comparing circuit. The base of transistor 133 is biased at a predetermined DC level by a voltage divider circuit including series connected variable resistor 136, resistor 135 and a resistor 137. Adjustment of the variable resistor 136 changes the bias on the transistor 133 and, therefore, the amount of (G—Y) signal on the base of transistor 145 required to produce operation thereof.

Figure 4:
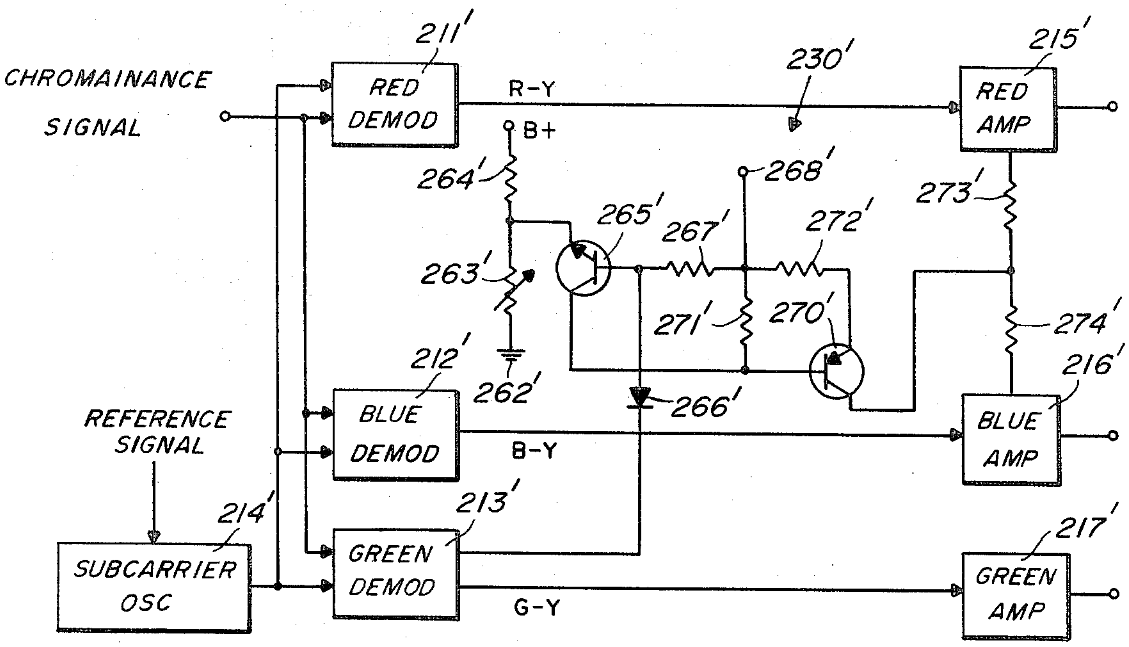
FIG. 4 is a schematic diagram similar to FIG. 2 illustrating another embodiment of the present invention.

Referring to FIG. 4, similar components are designated with similar numbers and a 2 is added as a prefix on each number to indicate a different embodiment similar to FIG. 2. In this embodiment a chrominance signal is applied directly to red, blue and green demodulators 211′, 212′ and 213′ and a reference signal from a subcarrier oscillator 214′ is also applied directly thereto. The demodulators supply (R—Y), (B—Y) and (G—Y) output signals, respectively, to red, blue and green amplifiers 215′, 216′ and 217′. The (G—Y) output signal from the green demodulator 213′ is also applied through a diode 266′ to the base of a transistor 265′. The emitter of the transistor 265′ is connected to the junction of series connected variable resistor 263′ and resistor 264′ connected as a voltage divider between B+ and ground 262′. The voltage divider circuit sets the voltage for the emitter of transistor 265′ (and is variable by way of the variable resistor 263′) to set the amount of (G—Y) signal required at the base to produce operation thereof. It should be understood that other circuitry might be devised for utilizing a reference signal to vary the effect and amount of signal required from the green demodulator to alter the red and blue amplifiers and to vary the amount the red and blue amplifiers are altered.

In each of the embodiments illustrated in the Figures a variable resistor 36 and 63′, respectively, is utilized to adjust the bias of the circuits to allow for background noise and set the minimum signal to which the circuit will respond. In this description, the circuits have been described as having phase angles such that the demodulation curve forms an ellipse with the major axis lying along the I axis (which causes the green components to be suppressed in amplitude and somewhat exaggerated in phase angle), but it should be understood that the present invention might be utilized to enhance colors along substantially any axis and a combination of more than one of the described circuits might be utilized to enhance colors along more than one axis. Thus, circuitry is disclosed for providing all the advantages produced by phase error compensation circuits, such as those producing elliptical demodulation curves, and for enhancing colors normally suppressed by such compensation circuits.

While we have shown and described specific embodiments of this invention, further modifications and improvements will occur to those skilled in the art. We desire it to be understood, therefore, that this invention is not limited to the particular forms shown and we intend in the appended claims to cover all modifications which do not depart from the spirit and scope of this invention.

We claim:

1. In a color television receiver adapted to receive a composite television signal including a chrominance signal, an improved automatic hue control comprising:

a. first, second and third means connected to receive at least the chrominance signal and convert the chrominance signal to first, second and third color components thereof, respectively;

b. first, second and third amplifying means coupled to said first, second and third means, respectively, for receiving and amplifying said first, second and third color components;

c. comparing means having a reference signal applied to one input thereof and the third color component applied to a second input thereof for providing a comparison of the reference signal and the third color component; and d. means coupling said comparing means to said first and second amplifying means for adjusting the outputs thereof in response to the comparison.

2. An improved automatic hue control as set forth in claim 1 wherein the television receiver includes apparatus energizeable to provide a noncircular demodulation curve and said automatic hue control includes switching means operable with the energization of said apparatus.

3. An improved automatic hue control as set forth in claim 1 wherein the first, second and third means are constructed to convert the chrominance signal to approximately red, blue and green components, respectively.

4. An improved automatic hue control as set forth in claim 1, wherein the third color component includes a positive green component, including in addition means coupled to the comparing means for combining the first and second color components to provide the reference signal including at least a negative green component.

5. An improved automatic hue control as set forth in claim 1 wherein the coupling means is connected to substantially reduce operation of the first and second amplifying means when the amplitude of the third color component substantially exceeds the amplitude of the combined signal.

6. An improved automatic hue control as set forth in claim 1 wherein the comparing means includes a differential amplifier.

7. An improved automatic hue control as set forth in claim 6 wherein the differential amplifier includes means for adjusting the bias on at least a part thereof to compensate for normal background color.

8. In a color television receiver adapted to receive a composite television signal including a chrominance signal, an improved automatic hue control comprising:

a. first, second and third means connected to receive the chrominance signal and convert the chrominance signal to first, second and third color components thereof, respectively;

b. first, second and third amplifying means coupled to said first, second and third means, respectively, for receiving and amplifying said first, second and third color components;

c. comparing means coupled to said first and second means for receiving a combined signal, including the first and second color components, and third color component and for providing a comparison of the combined signal and the third color component; and d. means coupling said comparing means to said first and second amplifying means for adjusting the outputs thereof in response to the comparison.

9. In a color television receiver adapted to receive a composite television signal including a chrominance signal, an improved method of automatically controlling the hue of the picture, comprising the steps of:

a. converting the chrominance signal to first, second and third color components;

b. providing a reference signal;

c. comparing the reference signal to the third color component; and d. altering the amplitudes of the first and second color components in response to the comparison.

10. An improved method as set forth in claim 9 wherein the amplitudes of the first and second color components are reduced when the amplitude of the third color component exceeds the amplitude of the reference signal.

11. An improved method as set forth in claim 9 wherein the reference signal is generally a negative green and the third color component is generally a positive green.

12. In a color television receiver adapted to receive a composite television signal including a chrominance signal, an improved method of automatically controlling the hue of the picture, comprising the steps of:

a. converting the chrominance signal to first, second and third color components;

b. combining the first and second components to provide a combined component;

c. comparing the combined component to the third color component; and d. altering the amplitudes of the first and second color components in response to the comparison.

* * * * *